3,660,328
DIELECTRIC FILMS
Claude A. Lindquist, Jr., Easton, Pa., assignor to
Pfizer Inc., New York, N.Y.
No Drawing. Continuation-in-part of application Ser. No. 697,934, Jan. 15, 1968, now Patent No. 3,551,197. This application July 27, 1970, Ser. No. 58,722
Int. Cl. C08g 17/16, 51/04
U.S. Cl. 260—22 R       4 Claims

ABSTRACT OF THE DISCLOSURE

Dielectric films of high capacitance consisting of finely divided ceramic dispersed in water-insoluble organic resin matrix, and process for their manufacture.

CROSS REFERENCE TO RELATED APPLICATION

The present invention is a continuation-in-part of my copending application Ser. No. 697,934, filed Jan. 15, 1968, now U.S. Pat. 3,551,197.

BACKGROUND OF THE INVENTION

The present invention relates to capacitor elements, and more particularly to dielectric films characterized by unusually high capacitance.

Capacitors which afford high capacitance per unit volume have been keenly sought for numerous applications where bulk and weight must be minimized for reasons of portability or space. Ceramic capacitors have been used in the past where high capacitance is needed, but their physical characteristics are not suited to the preparation of rolled condensers of low weight and bulk. On the other hand, some synthetic resin films exhibit the high dielectric strength needed in high voltage applications, but are characterized by dielectric constants too low to provide the required capacitance.

A substantial advance was provided by the discovery that dielectric films of high capacitance and high dielectric strength are afforded by coating an organic film base with a dispersion of finely divided ceramic in water-insoluble organic resin matrix, as described in my prior application Ser. No. 697,934 filed Jan. 15, 1968. This prior "sandwich" construction is of particular value for maximum energy storage where, although high capacitance is advantageous, high dielectric strength (resistance to voltage breakdown) is of paramount importance. The following relationship applies:

$$W = \tfrac{1}{2} CV^2$$

where
W = energy in joules
C = capacitance in farads
V = charging voltage

Thus, while energy stored is directly proportional to capacitance, it is also proportional to the square of the charging voltage, and doubling the latter will provide four-fold energy storage.

Accordingly, the dielectric strength can impose a limit on energy storage capacity. There are, however, many applications in which this limit is of little or no significance. For example, a capacitor capable of withstanding 1000 volts per mil may be used in a transistor circuit where it will never be exposed to more than 10 volts. In low voltage applications, capacitance (and hence dielectric constant) rather than dielectric strength controls energy storage capability.

Example 3 of prior application Ser. No. 697,934 filed Jan. 15, 1968 provides a "sandwich" film having a dielectric constant of 8 and a dielectric strength of 5300 volts per mil. In accordance with the present invention, unsupported films having dielectric constants up to 40 and even higher are afforded, at dielectric strengths above 1000 volts per mil. Where the goal is maximum capacitance, or minimum size, then the relation $$C = \frac{0.224 KA}{t}$$

applies, where

C = capacitance in farads
K = dielectric constant
A = area of one electrode in square inches
t = thickness of the dielectric in inches Thus, for the specific values cited above, the unsupported film has 40/8=5 times the capacitance of the sandwich or, often more important, provides a given capacitance at one-fifth the area, thus reducing physical size. On the other hand, where the goal is maximum energy storage, the sandwich construction will be preferred, as illustrated for the foregoing values:

$$\frac{W \text{ (sandwich)}}{W \text{ (free film)}} = \frac{(1/2)(1)(5.3)^2}{(1/2)(5)(1)^2} = 5.6 \text{ times as}$$

much energy storage capacity for the sandwich construction, as compared with the free film.

SUMMARY OF THE INVENTION

High capacitance dielectric elements in the form of unsupported flexible film up to one mil in thickness have now been prepared by intimately dispersing particulate ceramic in a solution of a water-insoluble organic resin matrix in non-reactive volatile solvent, casting a layer of the dispersion on a surface, preferably regenerated cellulose carrier film, evaporating the solvent and stripping the dried layer from the surface. The resulting film is characterized by a dielectric constant up to 40 and higher, and a dielectric strength of at least 1000 DC volts per mil of thickness.

Combined with conductive electrodes, the new dielectric films provide unusually high capacitance. They are strong and flexible, capable of being rolled, and with tensile strengths up to 1200 p.s.i. and higher. These physical properties are more than adequate for standard film capacitor metallizing, slitting and winding techniques.

These excellent properties are provided, in accordance with the invention, by a water-insoluble organic resin matrix up to one mil in thickness, containing uniformly dispersed therein from about 65 to 85% by weight of particulate titanate, tantalate or niobate ceramic having an average particle size below about 3 microns, and from about 0.5 to 5% by weight of a non-reactive dispersing agent for the ceramic.

DETAILED DESCRIPTION OF THE INVENTION

The dielectric films made by these dispersion, casting, and stripping techniques are truly unique. Whereas other film dielectrics have dielectric constants on the order of 3 or less, the dielectrics of the present invention have been produced with a dielectric constant of 44, and may well exceed that. Other desirable dielectric parameters have been obtained. For example, the dissipation factor of such materials is about 3% or less, while the dielectric strength is greater than 1000 volts per mil of thickness.

The films have desirable physical properties as well. They are readily prepared with relatively flawless surfaces and substantial strength. They may be made in a thickness of 0.0002 inch, even thinner, and obviously thicker. A typical tensile strength is 1200 p.s.i. This is more than adequate for handling and the manufacture of capacitors.

Many attempts have been made in the part to develop dielectric films with these electrical parameters in combination with desired mechanical (strength) properties that permit assembly and manufacture into a completed capacitor. Some materials have been developed with comparable electrical parameters, but the dielectric film has been so fragile, and otherwise lacking in desired mechanical characteristics, that a working capacitor could not be made. The present invention combines unique and desired electrical characteristics with physical properties that permit manufacture into a commercial film capacitor.

Any particulate titanate, tantalate or niobate ceramic may be employed, provided that it has an average particle size below about 3 microns. Strontium titanate, calcium titanate, cadmium niobate and lead titanate are appropriate compounds, and barium titanate is especially preferred.

Barium titanate is a product of commerce, and can be obtained in various grades which are characterized by dielectric constants ranging from about 1250 to 3000, as measured in sintered form. It can also be chemically prepared by wet milling titanium dioxide with barium carbonate for several hours, followed by drying and heating at about 1280–1285° C. for about one hour. After cooling, the product is pulverized, e.g. to a particle size range of about 0.5–3 microns, suitably by hammer-milling.

I have found that the commercial "capacitor" grade of barium titanate can be beneficiated by washing with boiling water to remove soluble ions. The resulting improvement in such dielectric parameters as dissipation factor and dielectric strength is marked. Such pretreatments may also be applied with benefit to the higher grade "CP" (chemically prepared) barium titanates.

The dielectric constant of barium titanate, as is well known, reaches a peak at about 120° C., the so-called "Curie point," beyond which the crystal changes from tetragonal to cubic. Instead of 100% barium titanate, combinations of titanates of varying Curie peak can be employed, e.g. barium-lead titanate or barium-strontium titanate, to achieve dielectric constants of more linear temperature coefficient.

Best results are achieved when the ceramic powder constitutes from about 65 to 85 weight percent of the composition. Ceramic concentrations below 65% may be employed, but they do not utilize to the fullest extent the excellent dielectric property of the ceramic. It is also possible to employ ceramic loadings above 85%, but the added increase in dielectric constant is minor, and the resulting coating may suffer in flexibility and abrasion resistance.

In view of the adverse effect of water on electrical properties, the organic resin matrix in which the ceramic is dispersed must be a hydrophobic or water-insoluble resin. A great variety of organic resins lend themselves to this requirement, including the fluorocarbon resins such as polytetrafluoroethylene and polychlorotrifluoroethylene; cellulosics such as cellulose acetate butyrate, cellulose nitrate, cellulose propionate, and methyl and ethyl cellulose; copolymers of unsaturated polyesters with styrene or other monomers; alkyd resins such as those produced by condensation of phthalic anhydride with fatty acid glycerides; epoxy resins; polyamides such as the condensation product of adipic acid with hexamethylene diamine; polyethylene and polypropylene; polystyrene; polyurethanes; polyvinyl chloride and vinyl chloride-vinyl acetate copolymers; polyvinylidene chloride; silicone resins; polysulfone resins; polyphenylene oxide resins; and polyimide resins. The resin will preferably exhibit a 24-hour water absorption below about 2%. It can be chosen for specific properties, e.g. unusually high temperature stability, power factor, insulation resistance or the like, to satisfy a particular application. Especially preferred for most purposes are the polyester and polycarbonate resins.

Excellent results are achieved employing saturated polyester resins, which are linear condensation products of aromatic and/or aliphatic dicarboxylic acids with dihydric alcohol such as polymethylene glycol, e.g. ethylene glycol. These may be prepared by esterification of the respective acids and alcohol, or by transesterification of the appropriate bis-(hydroxyalkyl) esters of the dicarboxylic acids, suitably by heating at about 200–300° C. under reduced pressure. Typical resins of this type, described in U.S. Pat. 2,892,747, are the polyesters of a polymethylene glycol of 2 to 6 carbon atoms with a combination of dicarboxylic acids consisting of 20–60 mol percent terephthalic acid, 15–50 mol percent isophthalicacid and 10–50 mol percent of at least two saturated acyclic dicarboxylic acids, such as adipic and sebacic acids. The acyclic acids preferably contain 4 to 10 carbon or carbon and oxygen atoms in a linear chain between the carboxylic groups, and are employed in a mutual molar ratio of 0.5–2.0. Such polyesters, having inherent viscosity of 0.4 to 1.0, may be employed in a reaction-inert solvent, such as dioxane, tetrahydrofuran, methylene chloride, chloroform, 1:1 toluene:dioxane or 1:3 dioxane:methyl ethyl ketone, or they may be blended with high-boiling solvents or plasticizers and cast by hot-melt techniques.

Other appropriate polyesters, described in U.S. Pat. 2,623,033, are the condensation products having an inherent viscosity of 0.6 or more, prepared by esterifying polymethylene glycols of 2 to 6 carbon atoms with a combination of dicarboxylic acids consisting of 30 to 60 weight percent aromatic dibasic acid, such as terephthalic acid, and 70 to 40 weight percent saturated acyclic dicarboxylic acid of 6 to 11 carbon or carbon and oxygen atoms in a linear chain between the carboxyl groups, e.g. sebacic acid.

When such saturated polyesters are employed as resin matrix, it is sometimes beneficial, although not essential, to incorporate a polyfunctional isocyanate in minor proportion in the composition, to achieve further condensation or cross-linking of the polyester in the coating composition. Typical of such polyisocyanates are those described in U.S. 2,683,730, i.e. mixtures of compounds of the general formula

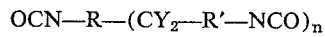

in which R and R' are arylene, e.g. phenylene; Y is hydrogen, alkyl or aryl, preferably hydrogen; and $n$ is a whole number. For clarity, this formula may be rewritten as

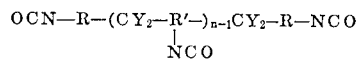

showing that the recurring units are jointed to the chain through the arylene radicals. Such mixtures, preferably containing 60% or more of polyisocyanate having more than two isocyanate groups per mole, are prepared by reaction of an aryl mono primary amine with an aliphatic or aromatic aldehyde or ketone, followed by rearrangement of the resulting secondary polyamines with mineral acid, and phosgenation of the rearranged primary polyamines.

Another class of agents, suitable for use in further condensing the polyesters, are those polyisocyanates described in U.S. Pat. 2,855,421, i.e. the reaction products of trihydric and dihydric alcohols with organic diisocyanate in the proportions of 1 to 1.7 isocyanate groups per hydroxyl group. Suitable trihydric alcohols include triethanolamine and lower aliphatic trihydric alcohols such as trimethylolpropane. Appropriate dihydric alcohols include diethylene glycol and lower aliphatic glycols such as 1,3-butylene glycol. The organic diisocyanate may be alkyl or cycloalkyl, e.g. hexamethylene diisocyanate, or aryl or alkaryl, e.g. tolylene diisocyanate. The resulting polyisocyanates may be employed in a reaction-inert solvent, e.g. ethyl acetate. They may be converted into blocked isocyanates by reaction with phenol or malonic ester to bind the free isocyanate groups, forming addition products capable of being decomposed by heat, thereby releasing polyisocyanate for reaction at elevated temperature.

The optimum levels of such isocyanate curing agents are readily calculated from the hydroxyl content of the polyester, and levels of about 5–25 wt. percent based on the polyester are typical.

Another class of resins suitable for the matrices of the new dielectric films are the polycarbonate resins, such as the carbonic acid esters of bis-(4-hydroxyphenyl)2,2-propane (bisphenol A), prepared by the reaction of phosgene with bisphenol A. Suitable solvents for use with these resins are dioxane and the chlorinated hydrocarbons such as methylene chloride, ethylene dichloride, chloroform, tetrachloroethane and 1,1,2-trichloroethane. Polycarbonate resins are available commercially from the General Electric Company and the Mobay Chemical Company.

It is also necessary to include a non-reactive wetting or dispersing agent in the coating composition, to insure uniform dispersion of the ceramic throughout the organic resin matrix, and therefore to insure that the optimum dielectric properties are achieved. A great variety of dispersing agents can be used to advantage. Among the non-ionic surface active agents are the polyethers which result from condensation of ethylene oxide with octylphenol, nonylphenol, or lauryl, octyl, stearyl or oleyl alcohols. Other such agents include polyoxyethylene sorbitol hexaoleate, and the fatty acid esters of polyethylene glycols. Likewise, anionic agents may be employed, such as the alkylaryl ether sulfates, sodium isopropyl naphthalene sulfonate, and the dialkyl sulfosuccinates, as well as cationic agents such as N-hexadecyl and N-octadecenyl trimethylene diamine dioleates. Particularly good results have been achieved with lecithin, which imparts excellent anti-settling properties to the dispersion, and with combinations of lecithin and sodium dioctyl sulfosuccinate. Dispersing agent levels should range from about 0.5 to 5 weight percent of the total solids, and about 2–3% usually gives excellent results.

It is ordinarily necessary to dilute the organic resin matrix composition with a volatile solvent to facilitate the casting operaion. The choice of solvent will depend upon the solubility characteristics of the particular resin selected to form the matrix, as well as on the viscosity characteristics most suitable to the particular casting method chosen. Before casting, it is usually preferred that the dispersion have a Stormer viscosity of about 50–110 Krebs units, especially 60–80. Any reaction-inert solvent capable of subsequent removal by evaporation can be employed. A number of suitable solvents have already been mentioned above, and others will readily occur to those skilled in the art. By "reaction-inert" is meant a solvent which is free of adverse effect on the resin matrix components under the coating conditions. Both dioxane and methylene chloride have been found eminently suitable for the purpose. In addition, in some cases it may be desirable to include a more permanent diluent in the form of a minor proportion of plasticizer for the resin which forms the matrix. Thus, for example, in the case of a polyvinyl chloride matrix, any one of the high-boiling esters which are recognized polyvinyl chloride plasticizers can be used, i.e. dioctyl phthalate, tricresyl phosphate, trioctyl phosphate, and dibutyl sebacate. Typical plasticizer proportions will range from about 5 to 50% based on the weight of the resin which forms the matrix.

For high capacitance, the new films are formed up to one mil in thickness. Several methods are available for preparing such films. For example, the dispersion can be doctored onto a smooth cylinder of large diameter, preferably heated, and the film stripped from that point on the circumference at which it is dry. Another way is to doctor the dispersion onto an endless belt, for example stainless steel, which then passes through a drying oven. At the exit of the oven the dried dielectric film can be separated from the belt with the aid of such devices as mechanical and air doctors and then rewound. In yet another way, the dispersion can be coated upon a film, dried in an oven, then subsequently stripped from the carrier film.

The latter method is the one preferred. Although various carrier films may be employed, a film has been discovered which is far superior to any others tried. It has a good surface which, of course, is duplicated faithfully by the cast dielectric film; it is rather inexpensive; and, finally, polymeric-ceramic dispersions separate readily from its surface. This film is plain uncoated regenerated cellulose (commercially available from du Pont as "PUD" cellophane). The product may contain from 5 to 10% water. There are usually no problems in separating coatings from this carrier film. However, if a system should tend to stick to its surface, separation may be effected by exposing the roll to high humidity. When moisture is absorbed by the cellulose film, it expands and becomes soft causing ready separation of the coating from its surface. As simple as the use of cellophane may appear, it makes easy, and commercially sound, an otherwise difficult-film-forming procedure.

The dispersion of ceramic in resin solution can be suitably applied to the carrier film or other surface by use of a knife-coating technique, for example with a precision knife-over-roll coater. The resin matrix dispersion containing the particulate ceramic and other ingredients is first thoroughly homogenized, and this is appropriately accomplished by milling in a ceramic ball mill to avoid contamination by electrically conductive impurities. Immediately before coating, it is best to filter the dispersion, as through a filter of about 5 micron pore size. The coating is applied to the carrier film or other surface, and it can then be dried, either at ambient or elevated temperature, and stripped.

With the disclosed techniques, it will be appreciated by those skilled in the art that former design restrictions have been lifted. For example, if the capicitor film has an effective dielectric constant of several times that previously available, e.g. 44 instead of 3, then either the size can be reduced nearly $\frac{1}{15}$ or else, for a given size, the capacitance will be nearly 15 times as great.

The capacitor is formed by combining the dielectric film with conductive elements or electrodes, preferably in sheet or strip form. As is well known in the art, this can be accomplished by mounting or rolling the dielectric film between a pair of metal foil strips, or alternatively by depositing a metallic coating on both surfaces of the dielectric film, e.g. aluminizing by vapor deposition. Dielectric films are commonly rolled with interleaving foils to form a capacitor. A common type would use two dielectric films and two aluminum foils, in alternate layers, to make up the rolled capacitor. Also considered a part of this invention is the fact that the dielectric coating herein described need not necessarily be stripped but may be coated directly upon one of both sides of an electrically conductive foil, such as aluminum, and this layered material used for the capacitor. In such case the foil would be coated with stripes of the dielectric, leaving areas of bare foil in a longitudinal direction, which would subsequently be used for attachment of leads for electrical connections. One advantage of coated foil would be the intimacy of contact, with no air interface between dielectric and conductor. Another would be the simplification inherent in coating a foil directly, instead of making a film to be then interleaved with separate foil.

Yet another construction is possible with the free dielectric films disclosed heerin. The film need not necessarily take the form of a rolled capacitor. To reduce inductive effects, or for other purposes, the free film may be cut into various configurations, for example rectangles, and interleaved with electrodes to produce a capacitor. The electrical and physical parameters of such a construction may be further enhanced by the application of both heat and pressure.

In all possible constructions it is evident that a considerable amount of variation is possible, affording maximum flexibility to the capacitor designer. Numerous ceramic and organic polymeric materials can be used to alter dielectric or physical properties. The interleaving of free film made with different polymers could stabilize the temperature coefficient of capacitance. Concentrations of the ingredients can be varied to develop specific capacitance capabilities. Electrodes, such as zinc, can be evaporated directly upon the free film surfaces, thus eliminating foil electrodes to markedly reduce the size.

The following examples are illustrative in nature and are not intended to limit the invention, the scope of which is defined by the appended claims.

EXAMPLE 1

| | Grams |
|---|---|
| Barium titanate [a] | 1065 |
| Polyester resin [b] | 1530 |
| Isocyanate curing agent [c] | 22.5 |
| Sodium dioctyl sulfosuccinate [d] | 9.0 |
| Soybean lecithin [e] | 24.0 |

[a] 0.5–3.0 micron particle size, capacitor grade, obtained from Titanium Alloy Manufacturing Division of National Lead Co. and beneficiated by stirring with boiling, deionized water for 15 minutes and dried, to remove soluble ions.
[b] A 20% solids solution of saturated polyester condensation product, available from Du Pont as No. 46950 adhesive, and described in U.S. Pat. 2,892,747.
[c] A 60% solids solution of blocked polyfunctional isocyanate as described in U.S. Pat. 2,855,421, available from Du Pont as RC–805.
[d] Aerosol OT–100%, available from Cyanamid.
[e] Available from Ross & Rowe as Yelkin TTS.

The above coating formulation, which represents 75.2 weight percent barium titanate on a solids basis, is prepared in the following manner: The ingredients, minus the curing agent, are milled together for 26 hours in a ceramic ball mill with high density, high alumina ¾ inch diameter balls equal to half the volume of the empty mill. The curing agent is then added and milling continued for 30 minutes more.

The resulting uniform dispersion is fed from the ball mill to a laboratory knife-over-roll coating machine with plain, uncoated regenerated cellulose film (Du Pont "PUD" cellophane). The knife is adjusted to give a 2.5 mil spacing over the celluose carrier film, at a coating speed of 50 lineal feed per minute. The coated film passes through an oven at 165° F. and is rewound at the oven exit. The dielectric film, about 0.55 mil thick, is subsequently stripped from the carrier film and found to exhibit a tensile strength of 1200 p.s.i., a dielectric constant of 44, a dissipation factor below 3% and a dielectric strength in excess of 1000 D.C. volts per mil of thickness.

Similar results can be obtained by substituting commercial CP ("chemically prepared") barium titanate for the less pure capacitor grade, without the pretreatment with boiling water. Where a lower viscosity casting formulation is desired, the adjustment may be made by diluting with dioxane.

The following commercially available dispersing agents have been successfully substituted for the lecithin-sodium dioctyl sulfosuccinate combination of the present example: "Amine O" (heterocyclic tertiary amine, available from Geigy Ind. Chemicals), "Sarkosyl O" (oleoyl sarcosin, available from Geigy Ind. Chemicals), and "Tenlo 70" (polyhydric alcohol sulfonic acid derivative, available from Nopco Chemical Co.).

EXAMPLE 2

| | Grams |
|---|---|
| Barium titanate (capacitor grade, 0.5–3µ) | 1065 |
| Polyester resin [a] | 283.8 |
| Isocyanate curing agent [b] | 74.0 |
| Sodium dioctyl sulfosuccinate [c] | 9.0 |
| Soybean lecithin [d] | 24.0 |
| 1,4-dioxane | 1224 |

[a] 100% solids, saturated polyester condensation resin, available from Du Pont as No. 49000, described in U.S. Pat. 2,892,747.
[b] Cf. footnote c, Example 1.
[c] Cf. footnote d, Example 1.
[d] Cf. footnote e, Example 1.

This formulation, which represents 74.8 weight percent barium titanate on a solids basis (37.3% by volume), illustrates the substitution of solid polyester resin in dioxane for the commercially available resin solution of the previous example, while increasing the isocyanate curing agent level. The formulation is processed as in Example 1 to prepare a 0.55 mil dielectric film having a dielectric constant of 27, a dissipation factor of 1.4% and a dielectric strength of 2500 D.C. volts per mil. The formulation could be modified by substituting 40.0 grams of "Amine O" (heterocyclic tertiary amine available from Geigy Ind. Chemicals) or "Tenlo 70" (polyhydric alcohol sulfonic acid derivative available from Nopco Chemical Co.) as the dispersing agent.

EXAMPLE 3

| | Grams |
|---|---|
| Barium titanate (CP grade, 0.5–3µ) | 266.25 |
| Polycarbonate resin [a] | 99.75 |
| Sodium dioctyl sulfosuccinate [b] | 2.25 |
| Soybean lecithin [c] | 6.0 |
| 1,4-dioxane | 650 |

[a] Polyester of carbonic acid and bis(4-hydroxyphenyl)2,2-propane available from General Electric as Lexan Resin 145.
[b] Cf. footnote d, Example 1.
[c] Cf. footnote e, Example 1.

This formulation is procesed as described in the previous examples to prepare a 0.50 mil dielectric film having a dielectric constant of 25, a dissipation factor of 2.3% and a dielectric strength of 1360 DC volts per mil.

EXAMPLE 4

Additional formulations suitable for the preparation of dielectric films by the process of Example 1 are as follows:

Formulation A

| | Grams |
|---|---|
| Barium titanate [a] | 844 |
| Polyester resin [b] | 1530 |
| Isocyanate curing agent [c] | 22.5 |
| Sodium dioctyl sulfosuccinate [d] | 9.0 |
| Soybean lecithin [e] | 24.0 |

[a] Cf. footnote a, Example 1.
[b] Cf. footnote b, Example 1.
[c] A 60% solids solution of polyfunctional isocyanate, available from Du Pont as RC–829 and described in U.S. Pat. 2,683,730.
[d] Cf. footnote d, Example 1.
[e] Cf. footnote e, Example 1.

Formulation B

| | Grams |
|---|---|
| Strontium titanate (below 3µ) | 1065 |
| Polycarbonate resin [a] | 319.5 |
| Sodium dioctyl sulfosuccinate [b] | 9.0 |
| Soybean lecinthin [c] | 24.0 |
| Methylene chloride | 1324 |

[a] Polyester of carbonic acid and bis(4-hydroxyphenyl)2,2-propane, available from General Electric as Lexan Resin 105.
[b] Cf. footnote d, Example 1.
[c] Cf. footnote e, Example 1.

Formulation C

| | Grams |
|---|---|
| Cadmium niobate $Cd_2Nb_2O_7$ (below 3µ) | 810 |
| Polyester resin [a] | 328.5 |
| Epoxy resin [b] | 33.9 |
| Sodium dioctyl sulfosuccinate [c] | 9.0 |
| Soybean lecithin [d] | 24.0 |
| Toluol | 205 |
| Methyl ethyl ketone | 330 |

[a] Linear saturated polyester resin having intrinsic viscosity of 0.59±0.3 (molecular weight about 20,000) and hydroxy value of 3.0, available from Goodyear Tire and Rubber Co. as Vitel PE–200.
[b] Polyether of epichlorohydrin and bisphenol A having an average molecular weight of 1000, a melting point of 64–76° C., an epoxy value of 0.20 equivalent per 100 grams and a hydroxyl value of 0.32 equivalent per 100 grams, available from Shell as Epon 1001.
[c] Cf. footnote d, Example 1.
[d] Cf. footnote e, Example 1.

Formulation D

| | Grams |
|---|---|
| Barium titanate (CP grade, 0.5–3μ) | 1065 |
| Polycarbonate resin [a] | 319 |
| Sodium dioctyl sulfosuccinate [b] | 9.0 |
| Soybean lecithin [c] | 24.0 |
| 1,4-dioxane | 1200 |

[a] Polyester of carbonic acid and bis(4-hydroxyphenyl)2,2-propane available from the Mobay Chemical Co. of Pittsburgh as Merlon resin.
[b] Cf. footnote d, Example 1.
[c] Cf. footnote e, Example 1.

Formulation E

| | Grams |
|---|---|
| Barium titanate [a] | 1065 |
| Polyester resin [b] | 283.8 |
| Isocyanate curing agent [c] | 74.0 |
| Sodium dioctyl sulfosuccinate [d] | 9.0 |
| Soybean lecithin [e] | 24.0 |
| Tuluol | 525 |
| Methyl isobutyl ketone | 175 |

[a] Cf. footnote a, Example 1.
[b] Cf. footnote a, Formulation B of instant example.
[c] Cf. footnote c, Example 1.
[d] Cf. footnote d, Example 1.
[e] Cf. footnote e, Example 1.

What is claimed is:

1. A high capacitance dielectric element in the form of an unsupported flexible film up to one mil in thickness comprising a water-insoluble organic resin matrix containing uniformly dispersed therein from about 65 to 85% by weight of particulate ceramic having an average particle size below about 3 microns, and from about 0.5 to 5% by weight of a non-reactive dispersing agent for said ceramic, said ceramic being selected from the group consisting of titanate, tantalate and niobate ceramics.

2. The element of claim 1 wherein said ceramic is barium titanate.

3. The element of claim 1 wherein said matrix is saturated polyester resin.

4. The element of claim 1 wherein said dispersing agent is lecithin.

References Cited

UNITED STATES PATENTS

| | | | |
|---|---|---|---|
| 3,194,782 | 7/1965 | Devaney et al. | 260—40 |
| 3,264,536 | 8/1966 | Robinson et al. | 252—63.2 X |
| 2,987,482 | 6/1961 | Oliva | 252—63.2 |
| 2,791,705 | 5/1957 | Vieweg | 252—63.5 |
| 2,969,327 | 1/1961 | Quehl | 252—63.2 |

FOREIGN PATENTS

| | | | |
|---|---|---|---|
| 584,672 | 1/1947 | Great Britain | 252—63.5 |
| 920,738 | 3/1963 | Great Britain | 252—63.5 |

OTHER REFERENCES

Condensed Chemical Dictionary; Reinhold Publishing Corp.; 1961; p. 662, Sci. Lib., QD 5 C5 1961.

LEWIS T. JACOBS, Primary Examiner

U.S. Cl. X.R.

252—63.5; 260—30.6 R, 40 R